United States Patent
Mehra et al.

(10) Patent No.: US 12,504,984 B2
(45) Date of Patent: Dec. 23, 2025

(54) PORTABILITY OF VIRTUAL MACHINE CHECKPOINTS WITHOUT AFFECTING THE PERFORMANCE OF THE APPLICATION

(71) Applicant: Red Hat, Inc., Raleigh, NC (US)

(72) Inventors: Ashutosh Mehra, Toronto (CA); Daniel Heidinga, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 806 days.

(21) Appl. No.: 17/804,229

(22) Filed: May 26, 2022

(65) Prior Publication Data

US 2023/0409360 A1 Dec. 21, 2023

(51) Int. Cl.
*G06F 9/455* (2018.01)
*G06F 11/14* (2006.01)
*G06F 11/34* (2006.01)

(52) U.S. Cl.
CPC ...... *G06F 9/45558* (2013.01); *G06F 9/45508* (2013.01); *G06F 9/4552* (2013.01); *G06F 11/1471* (2013.01); *G06F 11/1484* (2013.01); *G06F 11/3409* (2013.01); *G06F 2009/4557* (2013.01); *G06F 2009/45591* (2013.01); *G06F 2201/815* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,409,589 B2 | 8/2008 | Mack et al. | |
| 7,793,153 B2 | 9/2010 | Subhreveti | |
| 7,937,618 B2 | 5/2011 | Dorai et al. | |
| 9,052,966 B1 * | 6/2015 | Quinlan | G06F 9/45508 |
| 9,069,782 B2 | 6/2015 | Yang et al. | |

(Continued)

OTHER PUBLICATIONS

Okhavi, et al.; "Creating a cyber moving target for critical infrastructure applications using platform diversity"; International Journal of Critical Infrastructure Protection; Jan. 28, 2012 (10 pages).

(Continued)

*Primary Examiner* — Wynuel S Aquino
(74) *Attorney, Agent, or Firm* — Kilpatrick Townsend & Stockton LLP

(57) ABSTRACT

Systems and methods are described for improving portability of virtual machine checkpoints without affecting system performance. In an example, a method includes determining, by a source computing system having a processor, via a virtual machine, and based on a runtime of an application on the virtual machine, one or more units of the application to compile as one or more non-portable units of the application; designating, as a non-entrant compiled code, the one or more non-portable units of the application, wherein the designation prevents execution of the one or more non-portable units; decompiling, by the source computing system, one or more stack frames associated with the one or more non-portable units of the application; sending, by the source computing system to a destination computing system, a checkpoint for the application; restoring, by the destination computing system via the virtual machine, from the checkpoint for the application, the runtime of the application.

20 Claims, 7 Drawing Sheets

(56) References Cited

U.S. PATENT DOCUMENTS

| | | | |
|---|---|---|---|
| 9,740,562 B2 | 8/2017 | Leibman et al. | |
| 10,133,655 B1 * | 11/2018 | Norton | G06F 9/4552 |
| 11,169,804 B2 | 11/2021 | Schlegel et al. | |
| 11,531,526 B1 * | 12/2022 | Dunham | G06N 3/08 |
| 11,693,641 B1 * | 7/2023 | G Rao | G06F 8/76 |
| | | | 717/151 |
| 2014/0007089 A1 * | 1/2014 | Bosch | G06F 9/4856 |
| | | | 718/1 |
| 2020/0201322 A1 * | 6/2020 | Somers | G05D 1/0088 |
| 2024/0134666 A1 * | 4/2024 | Jaeger | G06F 12/1475 |

OTHER PUBLICATIONS

Simao, et al; "A checkpointing-enabled and resource-aware Java Virtual Machine for efficient and robust e-Science applications in grid environments"; Concurrency and Computation: Practice and Experience; Dec. 21, 2011; (22 pages).

* cited by examiner

PORTABILITY OF VIRTUAL MACHINE CHECKPOINTS WITHOUT AFFECTING THE PERFORMANCE OF THE APPLICATION

BACKGROUND

Checkpoint Restore In Userspace (CRIU) is a tool to checkpoint and restore an application, program, container, and/or process on Linux. CRIU allows a user to snapshot the current runtime state of the application, program, container, and/or process onto a disk. The snapshot, referred to herein as checkpoint, can then later be used to restore the application, program, container, and/or process to the same state when the snapshot was taken. Thus, tools such as CRIU can be used to migrate an application, program, container, and/or process from one computer system to another computer system and also to facilitate a quick launch of applications, programs, container, and/or processes that can suffer from slow startup, for example, in virtual machine-based applications. Such tools may involve creating a checkpoint for an application, program, container, and/or process on a computing system at a source device (source system), after a virtual machine (e.g., JAVA VIRTUAL MACHINE (JVM)) has completed an initial start-up and/or warm-up phases. Upon a subsequent launch of the virtual machine, for example, in another device (destination system), the process of restoring the application, program, container, and/or process on the destination system may be expedited using the checkpoint.

Furthermore, the application, program, container, and/or process being restored may use functions (e.g., as part of its source code or libraries) that have been just-in-time (JIT) compiled to use, and thus rely on, one or more features of a central processing unit (CPU) of a computing system (CPU-specific features). An example of a CPU-specific feature of a host computing system relied on by the virtual machine is support for vector (SIMD) instructions. Processor vendors often improve support for SIMD instructions with newer processor releases, resulting in newer CPU-specific features. A set of CPU-specific features relied on by one JIT compilation of a function may be different from that relied on by another JIT compilation of the function. Furthermore, the CPU of the destination system need not provide the same set of CPU-specific features as the CPU of the source system.

SUMMARY

The present disclosure provides new and innovative systems and methods for improving portability of virtual machine-based checkpoints of an application using central processing unit (CPU)-specific functions without affecting the performance of the application. For example, such systems and methods may allow host computing systems of a virtual machine-based application to utilize its hardware capabilities to help ensure optimal performance of the virtual machine-based application. In an example, a method includes: determining, by a source computing system having a processor, via a virtual machine, and based on a runtime of an application on the virtual machine, one or more units of the application to compile as a non-portable unit; designating, as a non-entrant compiled code, the one or more non-portable units of the application, wherein the designation prevents execution of the one or more non-portable units; decompiling, by the source computing system, one or more stack frames associated with the one or more non-portable units of the application; sending, by the source computing system to a destination computing system, a checkpoint for the application; restoring, by the destination computing system via the virtual machine, from the checkpoint for the application, the runtime of the application.

In some embodiments, determining the one or more non-portable units further comprises: identifying, by the source computing system, a plurality of CPU-specific units of the application; for each CPU-specific unit of the plurality of CPU-specific units, determining one or more CPU-specific features required to compile the CPU-specific unit; and assessing, based on the one or more CPU-specific features, a portability metric for the respective CPU-specific unit; and identifying, after determining that one or more portability metrics corresponding to one or more respective CPU-specific units do not satisfy a baseline threshold, the one or more respective CPU-specific units as the one or more non-portable units of the application. The baseline threshold may be based on a set of CPU-specific features provided by the destination computing system. Also or alternatively, the baseline threshold may be based on a set of CPU-specific features commonly provided by the source computing system and the destination computing system.

In another example, a system for improving portability of virtual machine checkpoints without affecting system performance is disclosed. The system comprises a source computing system comprising: a memory, and a processor. When the instructions are executed by the processor, the instructions cause the source computing system to: determine, based on a runtime of the application via a virtual machine, one or more units of the application to compile as one or more non-portable units of the application; designate, as non-entrant compiled code, the one or more non-portable units of the application, wherein the designation prevents execution of the one or more non-portable units; decompile one or more stack frames associated with the one or more non-portable units of the application; and send, to a destination computing system, a checkpoint for the application.

In some embodiments, the system further includes the destination computing system comprising a destination memory, and a destination processor. The destination memory stores instructions that, when executed by the destination processor, causes the destination computing system to: receive, from the source computing system, the checkpoint for the application; and restore, from the checkpoint for the application, the runtime of the application via the virtual machine.

In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1A:
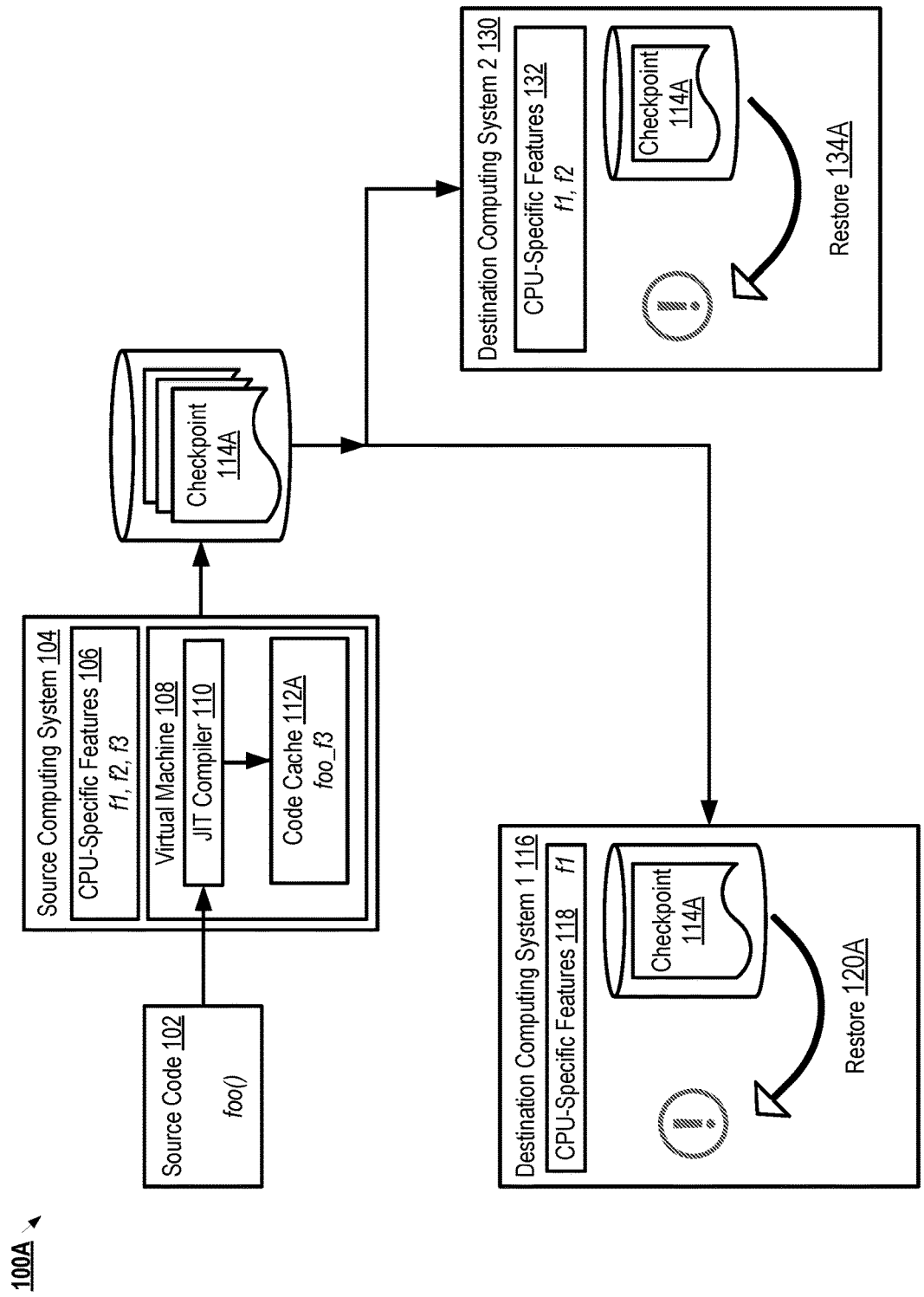
FIG. 1A is a block diagram illustrating a failed restoration of an application transferred via a virtual machine-based checkpoint, according to an example embodiment of the present disclosure.

Checkpoint restore tools (e.g., CRIU) can be used to migrate an application, program, container, and/or process from one computer system to another computer system. The application, program, container, and/or process being restored may use functions (e.g., as part of its source code or libraries) that can have multiple implementations, with each implementation requiring a different set of features from a central processing unit (CPU). However, the CPU of the destination system need not provide the same set of CPU-specific features as the CPU of the source system. Such differences in underlying systems can pose a problem for virtual machine-based applications, programs, containers, and/or processes. Virtual machines, such as JAVA VIRTUAL MACHINE (JVM), rely on dynamic compilation to improve the performance of the application, program, container, and/or process as the dynamic compiler has knowledge of the hardware it is compiling for. However, the dynamic compilation of applications, programs, containers, and/or processes may use the set of CPU-specific features of the source computing system.

For example, consider a virtual machine-based application that makes use of a function, foo( ) from a library. When a virtual machine dynamically compiles the application in a computing system (e.g., the source computing system), the call to foo( ) may be compiled to use CPU-specific features of the computing system (e.g., the source system). A checkpoint for the application can be taken after this dynamic compilation has occurred in order to expedite an otherwise slow startup of the application on the virtual machine. However, when the virtual machine attempts to restore the application in another computing system (a destination computing system), the checkpoint can prove fatal if the new computing system (the destination computing system) does not have the CPU-specific features being used by the function implementation. The particular compilation of the function implementation may therefore be a non-portable unit of the application.

There is thus a desire and need for a system and method that can allow virtual machine-based applications, programs, containers, and/or processes to seamlessly migrate from one computing system to another computing system having dissimilar CPU-specific features. However, even if virtual machine-based applications, programs, containers, and/or processes are rendered adaptable to different host computing system environments, there is a risk that such adaptability may occur at the expense of the quality of performance of the application. Therefore, there is also a desire and need to improve the portability without affecting the performance of the virtual machine-based application (e.g., by not under-utilizing the capabilities of the various host computing systems that have the potential to optimize the performance of the virtual machine-based application). Furthermore, there is a desire and need for a system and method that can leverage checkpoint and restore tools to improve portability of virtual machine-based applications, programs, containers, and/or processes, e.g., such that they adapt to the different computing systems.

Various embodiments of the present disclosure address one or more of the above described shortcomings. Systems and methods for improving portability of checkpoints of a virtual machine-based application using central processing unit (CPU)-specific functions without affecting the performance of the virtual machine-based application is disclosed that involves allowing a virtual machine to fully utilize the hardware features provided by a host computing system without compromising on the portability of the application. In various embodiments described herein, this utilization occurs by combining the virtual machine's ability to dynamically compile the application with the virtual machine's ability to decompile various aspects of the application (e.g., transitioning out of a compiled source code and back to the interpreter), and add record-keeping processes for the application using CPU-specific features, in the context of the checkpoint and restore events.

In at least one embodiment, the portability of a checkpoint of the virtual machine-based application may be improved without affecting the performance of the virtual machine-based application by making one or more of the following changes to the virtual machine. During a checkpoint-enabled runtime of the application, the virtual machine can track which units of the application have been compiled using CPU-specific features of the host computing system that cause the unit to have a portability metric that is beyond a baseline considered portable. The portability metric may be based, for example, by how extensively the specific unit requires one or more CPU-specific features of the host computing system, and/or by the degree to which a CPU-specific feature required by the unit is portable (e.g., common among other computing systems). As such units of the application, whose portability metric are beyond the baseline threshold, may not be portable due to the constraints posed by the non-portable CPU-specific features, such units may be referred to herein as non-portable units of the application. The baseline for assessing the strength of a portability metric of a CPU-specific feature can be adjusted. The units requiring CPU-specific features whose portability metrics are beyond the baseline can be designated as non-portable units, causing such units to be tracked. This tracking may be performed on a compilation unit by compilation unit basis. Such units may include both individual methods of the application and/or larger compiled bodies of the application, e.g., where in-lining of other methods has introduced the CPU-specific features into the larger compilation unit.

Before a source computing system (e.g., via a virtual machine) creates and persists a checkpoint for the virtual machine-based application to a disk, the virtual machine of the source computing system may mark the non-portable units as non-entrant compiled methods to prevent subsequent invocations (e.g., by any destination computing systems attempting to restore the application using the checkpoint). This designation may cause callers of the non-portable units to perform one or more corrective actions, such as decompiling the non-portable unit to an interpreter, waiting for a synchronous recompilation of the non-portable unit, or other similar actions. The virtual machine (e.g., at the source computing system) may also reset any required profiling counts for the non-portable units so that recompilation can happen when enough invocations have occurred after restoration. In some aspects, it may also be possible to schedule these non-portable units for recompilation on the destination computing system immediately after restoration of the application. The virtual machine (e.g., a JVM) of the source computing system can also (e.g., at a global safepoint caused by cooperatively pausing an execution of threads associated with the application) process stack frames associated with the application. If any stack frame corresponds to a non-portable unit, the source computing system (via the virtual machine) may decompile the frame (e.g., to safely transition any executing aspect out of the non-portable unit and into a known portable state).

When the application is being restored by the virtual machine on a destination computing system, the virtual machine may update its view of the current CPU-specific features so it can select appropriate instructions for new just-in-time (JIT) compilations. The virtual machine may choose to enqueue all methods in the non-portable method lists for immediate recompilation, and/or may recompile "naturally" based on existing heuristics of the virtual machine. After this recompilation, the virtual machine may be freed from tracking the non-portable units. The virtual machine may subsequently generate new non-portable units for the application based on the CPU-specific features of the underlying destination computing system.

Thus, by combining the above mentioned techniques of tracking non-portable methods, dynamic compilation, decompilation, and checkpoint/restore function, systems and methods presented herein may ensure that the virtual machine would be able to utilize the underlying hardware capabilities while maintaining portability of checkpoints of virtual machine-based applications across computing systems with different CPU-specific features.

FIG. 1A is a block diagram of a network environment 100A illustrating a failed restoration of an application transferred via a virtual machine-based checkpoint, according to an example embodiment of the present disclosure. The network environment 100A may include a source computing system 104 and one or more destination computing systems (e.g., destination computing system 1 116 and destination computing system 2 130). The source computing system 104 and the destination computing systems 116 and 130 may each comprise any computing device, computing system, and/or server that may have its own central processing unit (CPU) and other associated hardware (e.g., memory, other processors, etc.). For each computing system, a virtual machine (e.g., virtual machine 108 on source computing system 104) may be used to run and/or restore a virtual machine-based application using the host computing system's hardware capabilities and resources (CPU-specific features 106, 118, and/or 132). The virtual machine 108 may run a virtual machine-based application by performing a just-in-time compilation of a source code 102 associated with the application. The source code 102 of the application may include one or more functions, for example, the function foo ( ), as shown in FIG. 1A. It is contemplated that some functions, such as foo( ), may be compiled to use the hardware capabilities (e.g., CPU-specific feature) of the source computing system, resulting in a level of performance of the application that may have been different if, for example, the function was compiled using hardware capabilities of a different computing system.

The CPU and other hardware of each computing system may pose constraints on the virtual machine-based applications run by a virtual machine relying on the host computing system (e.g., virtual machine 108 relying on source computing system 104), based on the different set of features provided by the CPU of each computing system. For example, the CPU of source computing system 104 may provide a set of CPU-specific features 105, which, as shown in FIG. 1A for demonstration purposes, includes f1, f2, and f3. However, the set of CPU-specific features 118 of destination computing system 116 comprises f1 (and therefore missing f2, and f3), and the set of CPU-specific features 132 of destination computing system 130 comprises f1 and f2 (and therefore missing f3). It is contemplated that for each set of features, some features may deliver a better performance for the application than other features, if the former are utilized by the virtual machine 108 in the application. For example, while some features may correspond to older versions of extensions to support SIMD instructions, other features may correspond to newer versions of extensions to support the SIMD instructions. In the example shown in FIG. 1A, the features ranked from newest to oldest (and thus the ability to deliver the highest performance for the application to the ability to deliver the poorest performance for the application) are f3, f2, and then f1. For example, feature f3 may be a super set of feature f2, which in turn may be a super set of feature f1. The JIT compiler 110 may thus use feature f3 to produce the most optimized code (e.g., by compiling foo( ) utilizing feature f3.) The resulting virtual machine-based application may be checkpointed to a disk, with the resulting checkpoint having an application with the function implementation foo_f3 as the compiled version of the function foo( ).

As shown in FIG. 1A, the JIT compiler 110 of the source system 104 may perform a JIT compilation of the source code 102 of the application by relying on the CPU-specific feature of the underlying source computing system 104. In the embodiment shown in FIG. 1, the JIT compiler 110 selects the CPU-specific feature of the source computing system 104 that would yield the highest performing implementation of the function foo( ). That CPU-specific feature is f3. As a result of the JIT compilation, the virtual machine runs an implementation of the application, using a highest performing implementation of the function, foo( ), which is foo_f3. That implementation, foo_f3 is stored in a code cache 112A. However, as will be discussed, the function implementation foo_3 can be a non-portable unit of the application, as this implementation cannot easily be executed in other host computing systems due to the CPU-specific feature it requires, f3.

As will be explained further herein, the source computing system 104 may function as the source of a checkpoint 114A generated for an application that is intended to be migrated to other computing systems via the virtual machine 108, which in the example shown are the destination computing systems 116 and 130. The checkpoint may be a snapshot of the application is taken at run-time to allow virtual machines running on destination systems to quickly restore the application. Although source and destination are used in the names of computing systems 104 and 116/130, respectively, it is contemplated and/or expected that, in some embodiments, the destination computing systems 116 and 130 may serve as sources for further migration of the application to yet another computing system. Likewise it is contemplated and/or expected that, in some embodiments, the source computing system 104 may serve as a destination for a migration of the application from yet another computing system.

Since the snapshot of the application stored in the checkpoint 114A relies on a CPU-specific feature of source computing system 104 that yields the highest performing implementation of the function, foo( ), the checkpoint 114A may pose a problem for destination computing systems that seek to restore the application but do not have the same CPU-specific feature. For example, as shown in FIG. 1A, when the virtual machine at destination computing system 116 attempts to restore the application using the checkpoint 114A, the virtual machine would need CPU-specific feature, f3, in order to run the application having the function with the specific implementation, foo_f3. The virtual machine would be unable to execute the function, foo ( ), on destination computing system 116 because the set of CPU-specific features 118 of destination computing system 116 does not include the feature f3. Similarly, when the virtual machine at destination computing system 130 attempts to restore the application using the checkpoint 114A, the virtual machine would be unable to execute the function, foo( ), on destination computing system 130 because the set of CPU-specific features 132 of destination computing system 130 also does not include the feature f3. In both destination computing systems, the virtual machine-based application may lead to a fatal error.

Figure 1B:
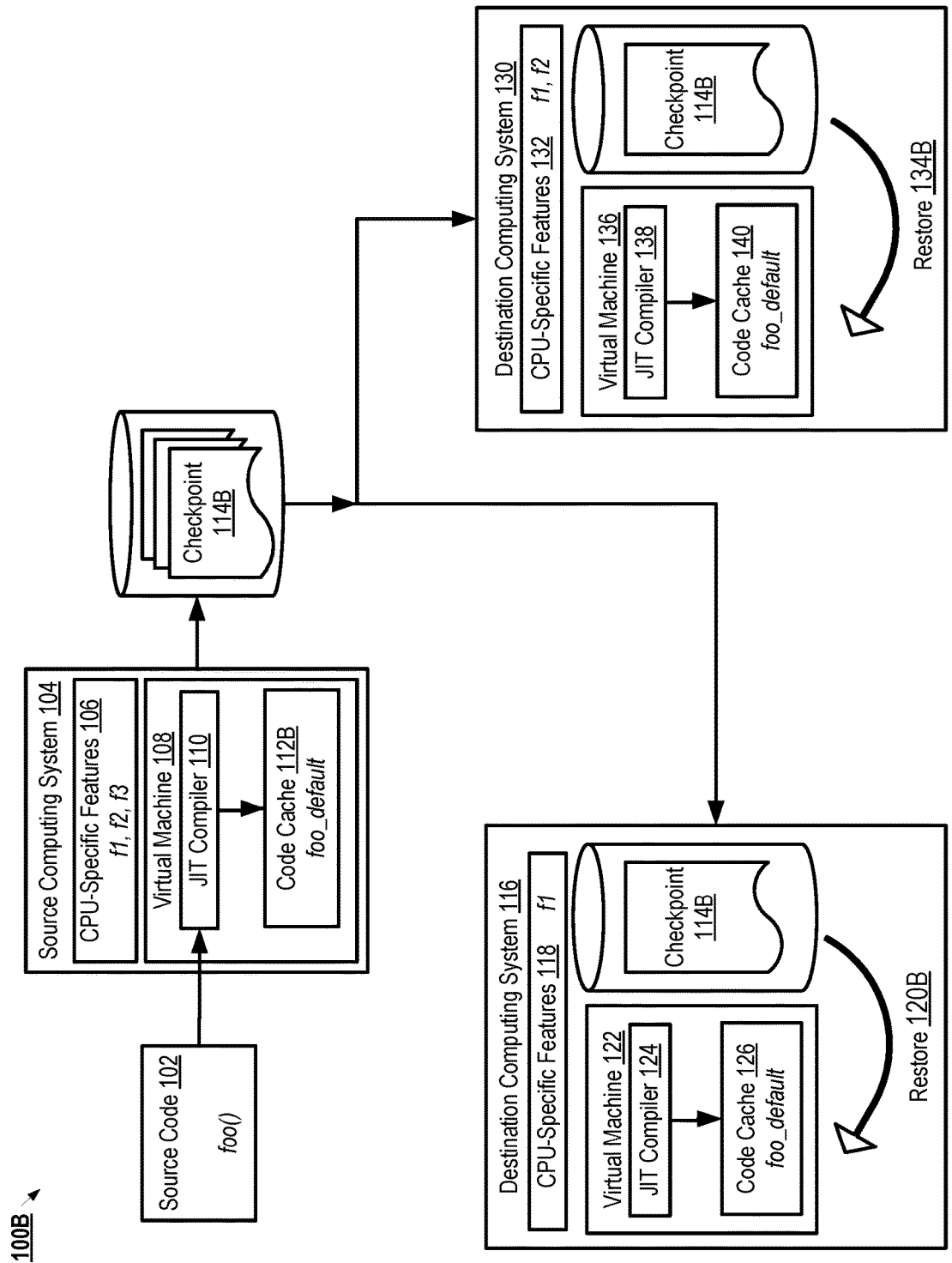
FIG. 1B is a block diagram illustrating a suboptimal restoration of an application transferred via a virtual machine-based checkpoint, according to an example embodiment of the present disclosure.

FIG. 1B is a block diagram of a network environment 100B illustrating a suboptimal restoration of an application transferred via a virtual machine-based checkpoint, according to an example embodiment of the present disclosure. Like network environment 100A of FIG. 1, network environment 100B includes source computing system 104 and destination computing systems 116 and 130, with each computing system hosting a virtual machine to compile, run, and/or restore a virtual machine-based application using the host computing system's hardware capabilities and resources (CPU-specific features 106, 118, and/or 132). Like network environment 100A of FIG. 1A, network environment 100B shows that virtual machine 108 on source computing system 104 may run a virtual machine-based application by performing a just-in-time compilation of a source code 102 associated with the application, and the source code 102 of the application may include the function foo( ) that can be compiled in multiple implementations.

In contrast to the embodiment shown in FIG. 1A, where the utilization of a highest quality CPU-specific feature for the compilation of function, foo( ), leads to failed restorations of the application in the destination computing systems, FIG. 1B shows the lowest risk approach to creating portability for checkpoint enabled, virtual machine-based applications. Specifically, FIG. 1B illustrates an embodiment where the utilization of a commonly shared CPU-specific feature yields a compilation with the lowest performance quality (e.g., the lowest common version of the SIMD instructions when creating the checkpoint), but leads to successful restorations of the application in destination computing systems (thereby improving the portability of the application). However, the compilation of an implementation of the function based on the commonly shared CPU-specific feature yielding the lowest quality performance among the computing system, rather than the compilation of an implementation based on a CPU-specific feature of the underlying host system that would yield the highest quality performance, under-utilizes the hardware capabilities (e.g., CPU-specific features) of the host computing systems.

As shown in FIG. 1B, the JIT compiler 110 of the source system 104 may perform a JIT compilation of the source code 102 of the application by relying on the CPU-specific feature of the underlying source computing system 104. However, in order to provide the lowest risk for portability of the application on other host computing systems, the virtual machine selects a CPU-specific feature that is the most likely to be in other computing systems (e.g., the oldest version of an SIMD instruction that may foreseeably exist in other computing systems). As a result of the JIT compilation, the virtual machine runs a compiled unit for function foo( ), foo_default, which relies on a commonly shared feature but one yielding the lowest performance quality (in order to present the least portability risk). Also or alternatively, for the same objective of providing the lowest risk for portability of the application, the virtual machine may opt for a compilation of the function that does not require any CPU-specific feature. In such an embodiment, foo_default may be a result of a JIT compilation that does not rely on any CPU-specific feature, e.g., to be the most adaptive to any host computing system (e.g., by having a high portability metric). That implementation, foo_default, is stored in a code cache 112B. Also or alternatively, for the same objective of providing the lowest risk for portability of the application, the virtual machine may opt for an implementation of the function foo( ) requiring only a portable, or lowest common denominator, hardware capability of the underlying host system. This portable set of features may be manually determined. In the network environment 100B shown in FIG. 1, the set of CPU-specific features shown for source computing device 104 (f1, f2, and f3) may be specific to the microarchitecture of the source computing system, and therefore may not be included as part of the portable set of features to be used by the JIT compiler 110. Consequently, the JIT compiler 110 may compile foo( ) to produce the function implementation foo_default, as such an implementation may be able to run on any microarchitecture. The resulting virtual machine-based application may be checkpointed to a disk, with the resulting checkpoint having an application with foo_default as the compiled version of the function foo( ).

The checkpoint thus formed 114B may improve the portability of the application for destination computing systems that seek to restore the application but do not have the same set of CPU-specific features. For example, destination computing system 116 is able to restore the application on the virtual machine 122, using the checkpoint 114B. After the restoration 120B, the virtual machine 122 may be able to execute the compiled code, foo_default. However, since foo_default was selected on the basis of optimizing portability at the expense of performance, the virtual machine 122 would not be able to use CPU-specific feature 118 f1 of destination computing system 116, Similarly, destination computing system 130 is able to restore the application on the virtual machine 136, using the checkpoint 114B. After the restoration 134B, the virtual machine 136 may be able to execute the compiled code, foo_default.

However, the virtual machine 136 would not be able to use CPU-specific features 132 f1 or f2 of destination computing system 130

Figure 2:
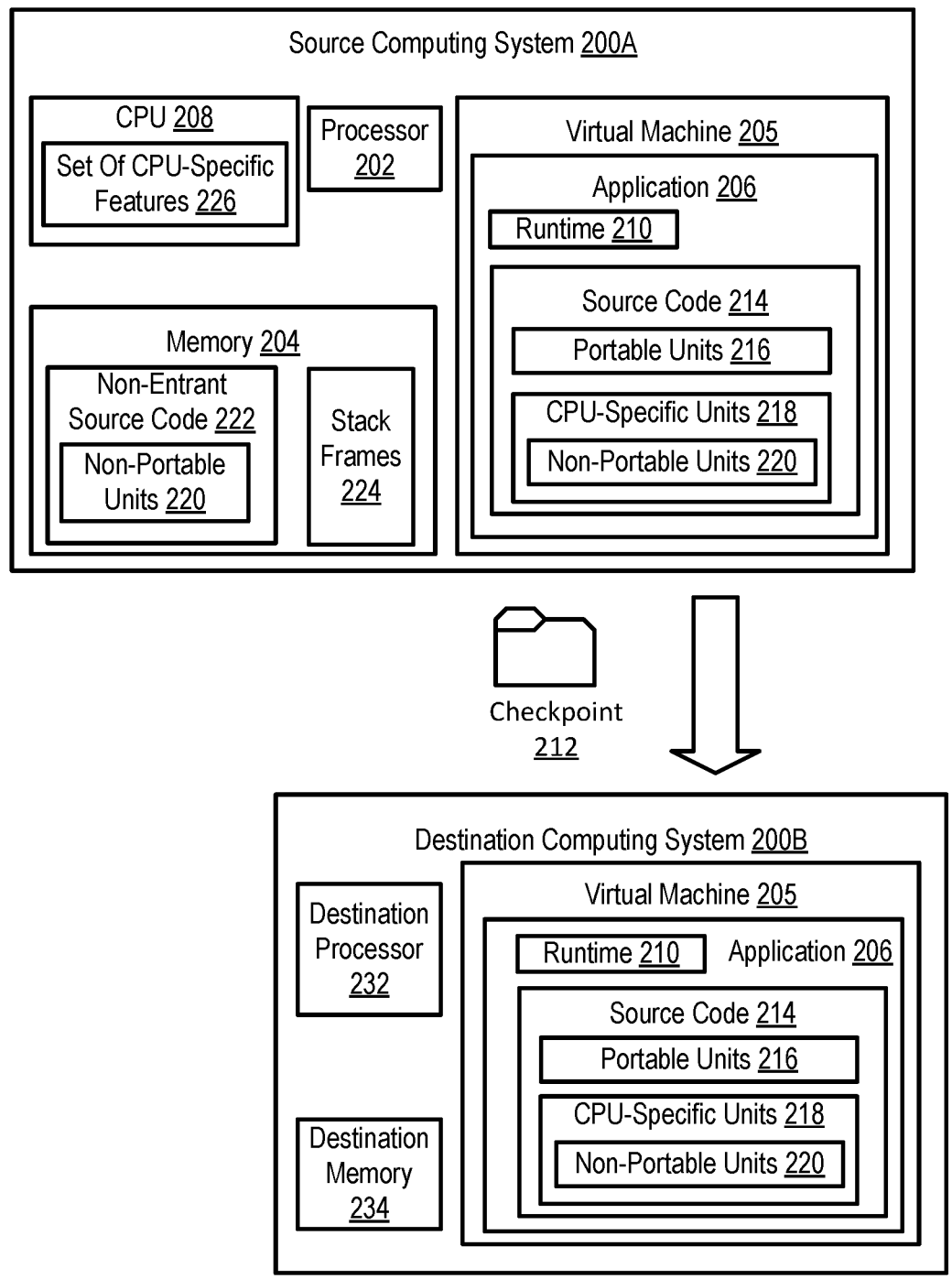
FIG. 2 is a block diagram of an example computer network environment for improving portability of virtual machine-based checkpoints of an application using central processing unit (CPU)-specific functions, according to an example embodiment of the present disclosure.

FIG. 2 is a block diagram of an example computer network environment 200 for improving portability of virtual machine-based checkpoints of an application using central processing unit (CPU)-specific functions, according to an example embodiment of the present disclosure. As shown in FIG. 2, the computer network environment 200 may include a source computing system 200A, and at least one destination computing system 200B. Various functions and components of these computing systems may improve the portability of virtual machine-based application checkpoints without affecting or significantly compromising the performance of the virtual machine-based application. The source computing system 200A may comprise a memory 204 (also referred to herein as source memory) and a processor 202 (also referred to herein as source processor). The memory 204 may store instructions that, when executed by the processor 202, can cause the source computing system 200A to perform one or more processes for improving the portability of a checkpoint 212 associated with a virtual machine-based application 206 without affecting or significantly compromising the performance of the virtual machine-based application. For example, the source computing system 200A can determine, based on a runtime 210 of the application 206, via a virtual machine 205, one or more non-portable units 220 of the application 206. The source computing system 200A may designate, as non-entrant source code 222, the one or more non-portable units 220 of the application 206. The designation may prevent the execution of the one or more non-portable units 220. The source computing system 200A may decompile one or more stack frames 224 associated with the one or more non-portable units 220 of the application 206, and send, to the destination computing system 200B, a checkpoint 212 for the application 206.

The destination computing system 200B may also comprise a memory (also referred to herein as destination memory (e.g., destination memory 234)) and a processor (also referred to herein as destination processor (e.g., destination processor 232)). The destination memory 234 may store instructions that, when executed by the destination processor 232, can cause the destination computing system 200B to perform one or more processes for restoring checkpoint enabled virtual machine-based applications without affecting or significantly compromising the performance of the virtual machine-based application. For example, the destination computing system 200B can receive, from the source computing system 200A, the checkpoint 212 for the application 206; and may restore, from the checkpoint 212 for the application 206, the runtime 210 of the application 206 via the virtual machine 205.

Figure 3:
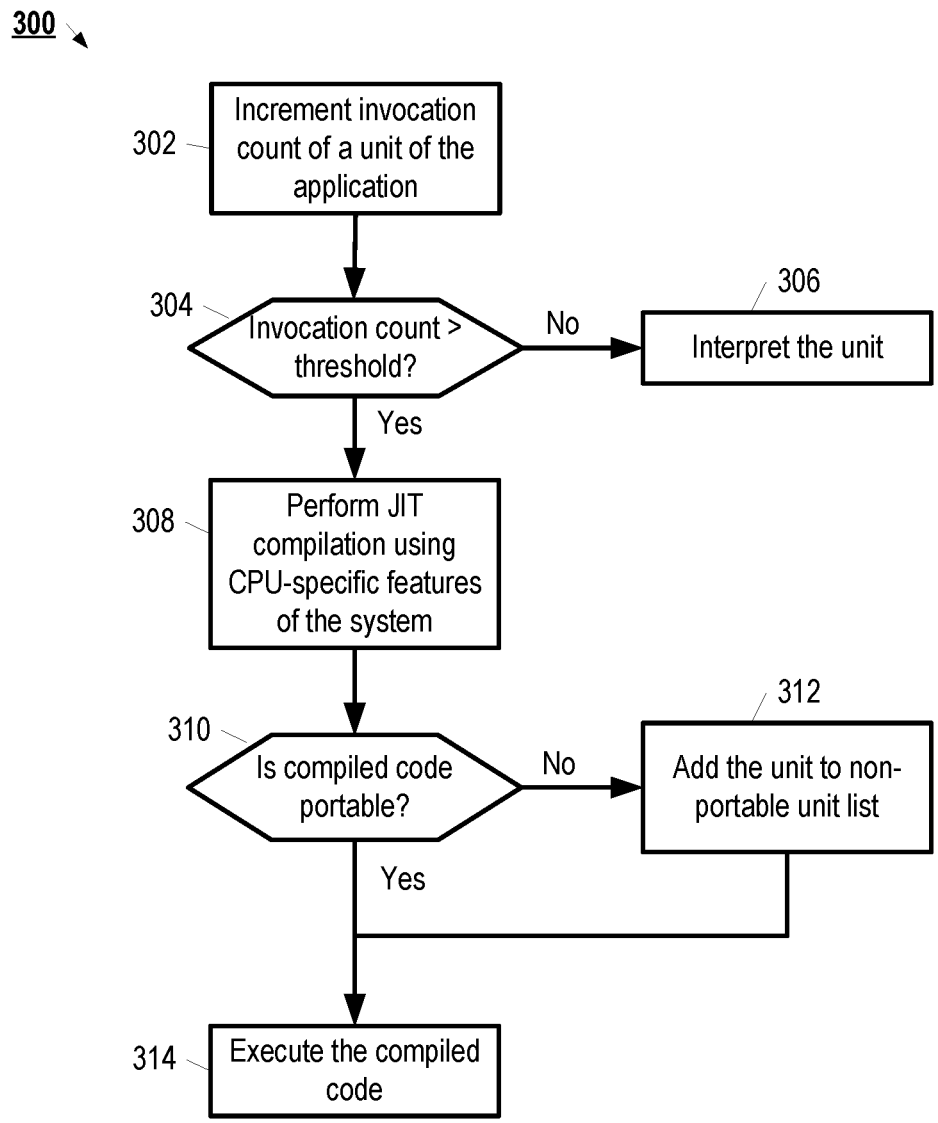
FIG. 3 is a block diagram showing an example process for tracking non-portable units of an application during a just-in-time (JIT) compilation, according to an example embodiment of the present disclosure.

FIG. 3 is a block diagram showing an example process 300 for tracking non-portable units of an application during a just-in-time (JIT) compilation, according to an example embodiment of the present disclosure. Process 300 may be performed by a processor of the source computing system (e.g., source processor 202 of source computing system 200A) during and/or in preparation for a dynamic compilation (e.g., just-in-time compilation) of a source code associated with a virtual machine-based application (e.g., source code 102/214 of application 206). One or more steps or processes within process 300 may facilitate an improvement in the portability of the virtual machine-based application in other computing systems (e.g., destination computing system 200B) while reducing or preventing any compromise in performance quality.

Process 300 may begin with the source computing system 200A incrementing an invocation count of a unit of the application (block 202). The unit may be any code, method, procedure, executable segment, or function of the source code of the application that may be arranged sequentially or systematically for incremental processing. The unit of an invocation count may be compared to a baseline threshold (block 304). The baseline threshold may be used to determine whether the unit of the invocation count meets a criteria to be compiled (rather than merely interpreted). Such criteria may depend, for example, on processing, power, and/or memory capabilities of the host computing system. The baseline threshold may be used to quickly process certain units of the source code (e.g., to conserve power) in order to defer a more involved compilation for lines of the source code that involve CPU or other hardware capabilities that are beyond the baseline threshold. If the invocation count is not a baseline threshold, the source computing system 200A may interpret the unit associated with the invocation count (block 306). In some aspects, interpreting the unit allows the unit to be directly executed without requiring the unit to be compiled.

If the invocation count is above the baseline threshold, the source computing system 200A may perform a just-in-time (JIT) compilation of the unit using CPU-specific features of the source computing system 200A (block 308). For example, the source computing system 200A may identify its set of CPU-specific features 106 and the JIT compiler 110 in virtual machine 205 may dynamically compile the unit using one or more CPU-specific features from the set.

At block 310, the source computing system 200A may determine whether the compiled code is portable. If the compiled code is not portable, the virtual machine running on the source computing system 200A may add the unit to a non-portable unit list (block 312). As will be discussed herein, the non-portable unit list may be used by the virtual machine to preemptively decompile when restored on a destination computing system, in order to re-compile using the CPU-specific features of that destination computing system. By creating the non-portable list, the virtual machine may track which units may be problematic for portability so as to prevent the fatal error event illustrated in FIG. 1B, while allowing the opportunity for a destination computing system to utilize its CPU-specific features for the best performance quality. This tracking may be done on a compilation unit basis, and may include both individual methods and larger compiled bodies where inlining of other methods has introduced the CPU-specific features into the larger compilation unit.

If, at block 310, the compiled code is determined to be portable, the virtual machine 205 of the source computing system 200A may execute the compiled code (block 314).

Figure 4:
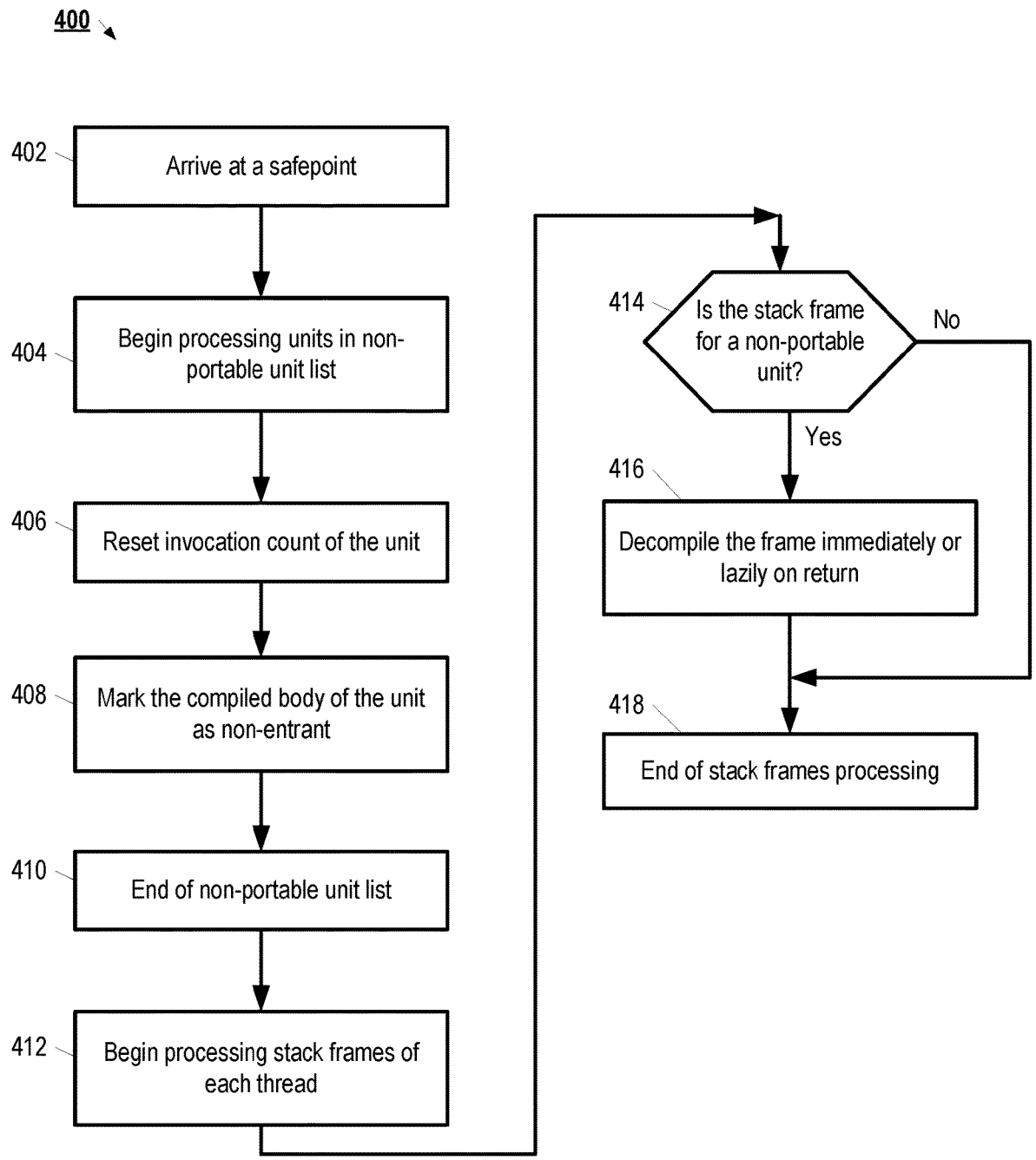
FIG. 4 is a block diagram showing an example process performed by a virtual machine to improve a portability of a virtual machine-based checkpoint of an application, according to an example embodiment of the present disclosure.

FIG. 4 is a block diagram showing an example process 400 performed by a virtual machine to improve a portability of a virtual machine-based checkpoint of an application, according to an example embodiment of the present disclosure. Process 400 may be performed by a processor of the source computing system (e.g., source processor 202 of source computing system 200A) during a safepoint after the dynamic compilation (e.g., just-in-time compilation) of the source code associated with a virtual machine-based application (e.g., source code 102/214 of application 206). Process 400 may facilitate an improvement in the portability of the virtual machine-based application in other computing systems (e.g., destination computing system 200B) by decompiling non-portable units.

Process 400 may begin with arriving at a safepoint (block 402). The safepoint may correspond to a predetermined period of time after a JIT compilation of the source code of the application (e.g., as explained in process 300 of FIG. 3). Also or alternatively, the safepoint may correspond to the time at which a checkpoint is created (e.g., by taking a snapshot of the application at runtime), but before the checkpoint is stored in a disk associated with the source computing system 200A. At block 404, the source computing system 200 may begin processing units of the non-portable units list. As previously discussed, the non-portable units list may be created and updated over one or more iterations of block 312 of FIG. 3. In some embodiments, before processing the units in the non-portable units list, the virtual machine of the source computing system 200A may prepare itself by running a garbage collector to shrink the heap associated with the application.

The processing of the units in the non-portable units list may include, for each unit, resetting the invocation count of the unit (block 406) and marking the compiled body of the unit as non-entrant source code (block 408) until the end of the non-portable unit list is reached (block 410). By marking the compilation body associated with the unit as non-entrant (block 408), the virtual machine may prevent future invocations from being able to enter this unit and may force all callers to take corrective action, such as decompiling to the interpreter, waiting for synchronous recompilation of the method, or other similar actions. Resetting any required invocation and/or profiling counts for the unit (block 406) may cause a recompilation to happen when enough invocations have occurred after restoration at a destination computing device. In some embodiments, it may also be possible to schedule these units for recompilation on the destination system immediately after restore. The resetting may occur at the source computing system (e.g., before checkpoint is taken). Alternatively, the resetting may occur during restoration at the destination computing system.

After reaching the end of the non-portable unit list, the virtual machine of the source computing device 200A may begin processing the stack frames of each thread (block 412).

At block 414, the virtual machine may determine whether a given stack frame corresponds to a non-portable unit from the list of non-portable units. If the given stack does correspond to a non-portable unit, the virtual machine may decompile the frame immediately (e.g., if currently being executed) or lazily on return (block 416). In some aspects, the decompilation of the frame may relegate the frame to an interpreter. This relegation may safely transition the given stack and/or the non-portable unit to a known portable state. A decompilation of the frame on return (e.g., if the frame is not currently being executed) may cause any attempt to return to the non-portable unit associated with the frame to trigger a transition to the interpreter. Once all stack frames have been checked to see if any correspond to non-portable units, the virtual machine of the source computing device 200A may end stack frames processing (block 418). By processing stack frames that corresponded to non-portable units, the virtual machine ensures, upon the creation of the checkpoint, that the stacks are in safe states for transitioning out of the non-portable units (e.g., by transitioning to the interpreter).

Figure 5:
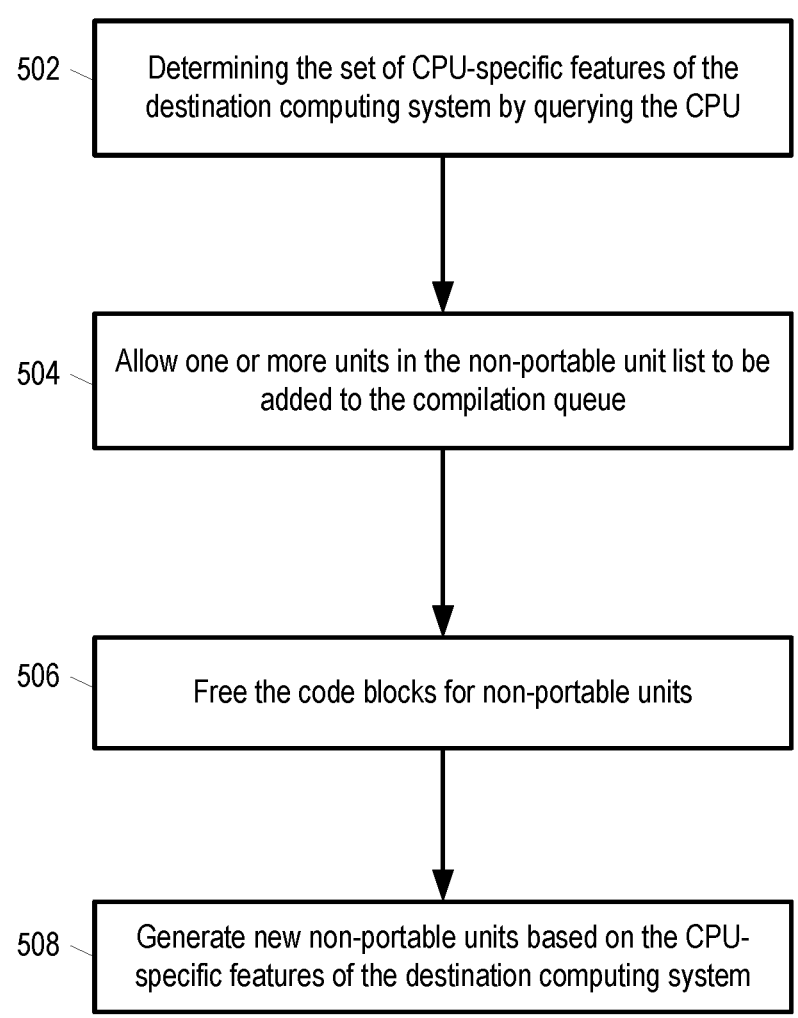
FIG. 5 is a block diagram showing an example process performed by a virtual machine to restore an application using an improved portability of a virtual machine-based checkpoint of the application, according to an example embodiment of the present disclosure.

FIG. 5 is a block diagram showing an example process performed by a virtual machine to restore an application using an improved portability of a virtual machine-based checkpoint of the application, according to an example embodiment of the present disclosure. Process 500 may be performed by a processor of the destination computing system (e.g., destination processor 232 of destination computing system 200B) during the restoration of a virtual machine-based application (e.g., source code 102/214 of application 206). One or more steps or processes within process 500 may allow the destination computing system 200B to restore the virtual machine-based application that reduces or prevents any compromise in performance quality.

As process 500 occurs during restoration at the destination computing system 200B, which may have a different set of CPU-specific features from that of the source computing system 200A, process 500 may begin with virtual machine of the destination computing system 200B identifying the set of CPU-specific features of the destination computing system by querying its CPU (block 502). For example, the virtual machine may update its view of the current CPU-specific features, which may have previously shown the set of CPU-specific features of the source computing system 200A, so it can select the appropriate instructions for new JIT compilations.

At block 504, the destination computing system 200B may allow one or more units of the non-portable units list to be added to a compilation queue. In some embodiments, the destination computing system 200B may enqueue all units of the non-portable units list for immediate recompilation. Also or alternatively, the destination computing system 200B may merely allow the units to recompile "naturally" based on existing heuristics of the virtual machine.

At block 506, the destination computing system 200B may free (e.g., from a code cache associated with the application) the code blocks corresponding to the non-portable units from the list of non-portable units (e.g., since the non-portable units, which may no longer be relevant as they are designed for the CPU-specific features of the source computing system 200A). The virtual machine of the destination computing system 200B may now able to generate new non-portable units based on the CPU-specific features of the destination computing system (block 208).

By combining the above mentioned techniques of tracking non-portable units, dynamic compilation (e.g., via JIT compilers), decompilation, and checkpoint/restore awareness, the virtual machine may be able to utilize the underlying hardware capabilities (e.g., of the source and destination computing systems) while maintaining portability of checkpoints across systems with different sets of CPU-specific features (e.g., the source computing system 200A having a different set of CPU-specific features from that of the destination computing system 200B.

Figure 6:
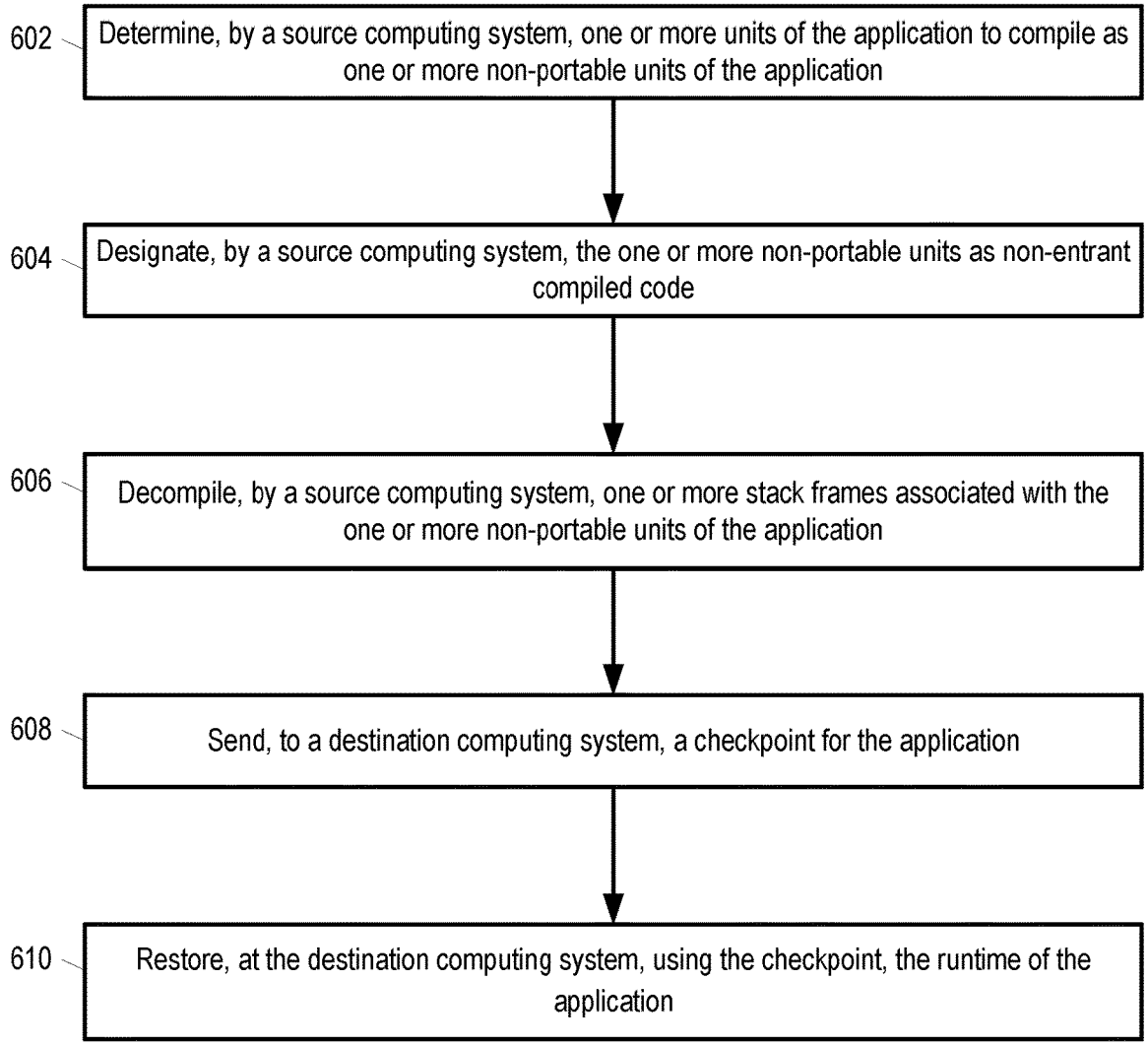
FIG. 6 illustrates a flowchart of an example process for improving portability of virtual machine-based checkpoints of an application using central processing unit (CPU)-specific functions, according to an example embodiment of the present disclosure.

FIG. 6 illustrates a flowchart of an example process 600 for improving portability of virtual machine-based checkpoints of an application using central processing unit (CPU)-specific functions, according to an example embodiment of the present disclosure. The process 600 may be performed by both the source computing system 200A and the destination computing system 200B, via their processors (e.g., source processor 202 and destination processor 232) based on instructions provided by a virtual machine hosted by the source computing system and the destination computing system (e.g., virtual machine 108/122/136).

Process 600 may begin with the source computing system determining one or more units of the application to compile as non-portable units of the application (block 602). For example, the one or more units to compile as non-portable units may be determined by identifying a plurality of CPU-specific units of the application. As previously discussed, in relation to FIG. 3, CPU-specific units of the application may comprise any code, method, procedure, executable segment, or function of the source code of the application that requires a CPU-specific feature of the underlying host computing system (e.g., source computing system, destination computing system, etc.) to run and/or compile. For each CPU-specific unit of the plurality of CPU-specific units, the source computing system may determine the one or more CPU-specific features required to compile the CPU-specific unit. Based on the one or more CPU-specific features, the source computing system 200A may assess a portability metric for the respective CPU-specific unit. As previously discussed in relation to FIG. 3, the portability metric may relate to how likely is it that the CPU-specific unit may be able to run on another computing system that may not share the same set of CPU-specific features. The source computing system may determine whether the one or more portability metrics corresponding to the one or more respective CPU-specific units satisfies a baseline threshold. If a portability metric for a given CPU-specific unit does not satisfy a baseline threshold, the CPU-specific unit may be designated as a non-portable unit. Thus, a list of non-portable units of an application may be created based on a determination that portability metrics corresponding to the respective CPU-specific units of that list do not satisfy the baseline threshold.

At block 604, the source computing system 200A may designate the one or more non-portable units as non-entrant compiled code (e.g., to prevent subsequent invocations). This designation may cause callers of the non-portable units to perform one or more corrective actions, such as decompiling the non-portable unit to an interpreter, waiting for a synchronous recompilation of the non-portable unit, or other similar actions. Thus, this designation may prevent a fatal error illustrated in FIG. 1B during the restoration of the application on a destination computing system.

At block 606, the source computing system 200A may decompile one or more stack frames associated with the one or more non-portable units of the application. For example, after designating each non-portable unit of the list of non-portable units of the application, the virtual machine running on the source computing system may begin processing the stack frames of each thread. The virtual machine may determine whether a given stack frame corresponds to a non-portable unit from the list of non-portable units. If the given stack does correspond to a non-portable unit, the virtual machine may decompile the frame immediately (e.g., if currently being executed) or lazily on return. In some aspects, the decompilation of the frame may relegate the frame to an interpreter. This relegation may safely transition the given stack and/or the non-portable unit to a known portable state. A decompilation of the frame on return (e.g., if the frame is not currently being executed) may cause any attempt to return to the non-portable unit associated with the frame to trigger a transition to the interpreter. Thus, by decompiling stack frames associated with the list of non-portable units of the application, the virtual machine may ensure, upon the creation of the checkpoint, that the stack frames are in safe states for transitioning out of the non-portable units (e.g., by transitioning to the interpreter).

At block 608, the source computing system 200A may send, to the destination computing system 200B, a checkpoint for the application. The checkpoint may comprise a snapshot of the runtime of the application to allow another computing system (e.g., the destination computing system 200B) to restore the application 118A. Furthermore, the checkpoint may include, for example, the state of a virtual machine running the application, including the non-portable units designated as non-entrant compiled code.

At block 610, a virtual machine at the destination computing system may restore, using the checkpoint, the runtime of the application. For example, virtual machine may identify a set of CPU-specific features provided by the second destination computing system (which may be different from the set of CPU-specific features provided by the source computing system). Using one or more of the set of CPU-specific features, the virtual machine at the destination computing system may perform a just-in-time compilation of CPU-specific units of the application. Also or alternatively, the virtual machine may relegate the CPU-specific units to an interpreter (e.g., to directly execute the CPU-specific units).

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
    determining, by a source computing system having a processor, via a virtual machine, and based on a runtime of an application on the virtual machine, a unit of the application to compile as a non-portable unit of the application;
    decompiling, by the source computing system and based on the determined non-portable unit, one or more stack frames associated with the non-portable unit of the application;
    generating, by the source computing system, a checkpoint for the application, wherein the checkpoint includes the non-portable unit of the application and the decompiled one or more stack frames, and wherein the non-portable unit is designated in the checkpoint as non-entrant compiled code to prevent execution of the non-portable unit by another computer system on which the virtual machine is restored using the checkpoint;
    sending, by the source computing system to a destination computing system, the generated checkpoint for the application; and
    restoring, by the destination computing system via the virtual machine, from the generated checkpoint for the application, the runtime of the application, wherein the restoring of the runtime involves a caller of the non-portable unit performing a corrective action based on the designation of the non-portable unit as non-entrant compiled code in the generated checkpoint.

2. The method of claim 1, wherein restoring the runtime of the application comprises:
identifying a set of CPU-specific features provided by the destination computing system; and
performing, using one or more of the set of CPU-specific features provided by the destination computing system, one more of:
a just-in-time compilation of CPU-specific units of the application, or
an interpretation of the CPU-specific units of the application.

3. The method of claim 1, wherein determining the non-portable unit further comprises:
identifying, by the source computing system, a CPU-specific unit of the application;
determining a CPU-specific feature required to compile the CPU-specific unit;
assessing, based on the CPU-specific feature, a portability metric for the CPU-specific unit; and
identifying, after determining that the portability metric corresponding to CPU-specific unit does not satisfy a baseline threshold, the CPU-specific unit as the non-portable unit of the application.

4. The method of claim 3, wherein the baseline threshold is based on a set of CPU-specific features provided by the destination computing system.

5. The method of claim 3,
wherein the baseline threshold is based on a set of CPU-specific features commonly provided by the source computing system and the destination computing system, and
wherein the destination computing system receives the checkpoint for the application from the source computing system.

6. The method of claim 1, further comprising:
resetting, by the source computing system or the destination computing system, a profiling count corresponding to the non-portable unit.

7. The method of claim 6, further comprising:
scheduling, by the destination computing system, a recompilation of the non-portable unit after the restoring of the application.

8. The method of claim 1, further comprising:
freeing, from a code cache associated with the application, a code block corresponding to the non-portable unit.

9. The method of claim 1, further comprising:
including, by the source computing system, a list of non-portable units in the checkpoint, wherein the list of non-portable units includes an identifier of the non-portable unit.

10. A system comprising:
a source computing system comprising:
a memory, and
a processor;
wherein the memory stores instructions that, when executed by the processor, causes the source computing system to:
determine, based on a runtime of an application via a virtual machine, a unit of the application to compile as a non-portable unit of the application;
decompile, based on the determined non-portable unit, one or more stack frames associated with the non-portable unit of the application;
generate a checkpoint for the application, wherein the checkpoint includes the non-portable unit of the application and the decompiled one or more stack frames, and wherein the non-portable unit is designated in the checkpoint as non-entrant compiled code to prevent execution of the non-portable unit by another computer system on which the virtual machine is restored using the checkpoint; and
send the generated checkpoint for the application to a destination computing system, wherein the destination computing system is configured to perform a restoration process to restore the runtime of the application using the generated checkpoint, wherein the restoration process involves a caller of the non-portable unit performing a corrective action based on the designation of the non-portable unit as non-entrant compiled code in the generated checkpoint.

11. The system of claim 10, further comprising:
the destination computing system, wherein the destination computing system comprises:
a destination memory, and
a destination processor;
wherein the destination memory stores instructions that, when executed by the destination processor, causes the destination computing system to:
receive, from the source computing system, the checkpoint for the application; and
restore, from the checkpoint for the application, the runtime of the application via the virtual machine, wherein the restoring of the runtime involves the caller of the non-portable unit performing the corrective action based on the designation of the non-portable unit as non-entrant compiled code in the checkpoint.

12. The system of claim 11, wherein the instructions, when executed, cause the destination computing system to restore the runtime of the application by:
identifying a set of CPU-specific features provided by the destination computing system; and
performing, using one or more of the set of CPU-specific features provided by the destination computing system, one more of:
a just-in-time compilation of CPU-specific units of the application, or
an interpretation of the CPU-specific units of the application.

13. The system of claim 11, wherein the instructions, when executed, further causes the source computing system or the destination computing system to:
reset a profiling count corresponding to the non-portable unit.

14. The system of claim 13, wherein the instructions, when executed, further causes the destination computing system to:
schedule a recompilation of the non-portable unit after the restoring of the application.

15. The system of claim 11, wherein the instructions, when executed, further causes the destination computing system to:
free, from a code cache associated with the application, a code block corresponding to the non-portable unit.

16. The system of claim 10, wherein the instructions, when executed, cause the source computing system to determine the non-portable unit by:
identifying a CPU-specific unit of the application;
determining a CPU-specific feature required to compile the CPU-specific unit;

assessing, based on the CPU-specific feature, a portability metric for the CPU-specific unit; and identifying, after determining that the portability metric corresponding to CPU-specific unit does not satisfy a baseline threshold, the CPU-specific unit as the non-portable unit of the application.

17. The system of claim 16, wherein the baseline threshold is based on a set of CPU-specific features provided by the destination computing system.

18. The system of claim 16, wherein the baseline threshold is based on a set of CPU-specific features commonly provided by the source computing system and the destination computing system.

19. A non-transitory computer readable medium storing instructions that are executable by one or more processors of a source computing system for causing the source computing system to perform operations including:

determining, based on a runtime of an application via a virtual machine, a unit of the application to compile as a non-portable unit of the application;

decompiling, based on the determined non-portable unit, one or more stack frames associated with the non-portable unit of the application;

generating a checkpoint for the application, wherein the checkpoint includes the non-portable unit of the application and the decompiled one or more stack frames, and wherein the non-portable unit is designated in the checkpoint as non-entrant compiled code to prevent execution of the non-portable unit by another computer system on which the virtual machine is restored using the checkpoint; and sending the generated checkpoint for the application to a destination computing system, wherein the destination computing system is configured to perform a restoration process to restore the runtime of the application using the generated checkpoint, wherein the restoration process involves a caller of the non-portable unit performing a corrective action based on the designation of the non-portable unit as non-entrant compiled code in the generated checkpoint.

20. The non-transitory computer readable medium of claim 19, wherein determining the non-portable unit further comprises:

identifying, by the source computing system, a CPU-specific unit of the application;

determining a CPU-specific features required to compile the CPU-specific unit;

assessing, based on the CPU-specific features, a portability metric for the CPU-specific unit; and identifying, after determining that the portability metric corresponding to CPU-specific unit does not satisfy a baseline threshold, the CPU-specific unit as the non-portable unit of the application.

* * * * *